(12) United States Patent
Huang

(10) Patent No.: US 11,549,543 B2
(45) Date of Patent: Jan. 10, 2023

(54) DRILL BIT STRUCTURE OF SELF-TAPPING SCREW

(71) Applicant: Hsiao-Wen Huang, Changhua (TW)

(72) Inventor: Hsiao-Wen Huang, Changhua (TW)

( * ) Notice: Subject to any disclaimer, the term of this patent is extended or adjusted under 35 U.S.C. 154(b) by 397 days.

(21) Appl. No.: 16/811,152

(22) Filed: Mar. 6, 2020

(65) Prior Publication Data

US 2021/0277926 A1   Sep. 9, 2021

(51) Int. Cl.
*F16B 25/10* (2006.01)

(52) U.S. Cl.
CPC .................................. *F16B 25/103* (2013.01)

(58) Field of Classification Search
CPC ....................................................... F16B 25/103
See application file for complete search history.

(56) References Cited

U.S. PATENT DOCUMENTS

| | | | | |
|---|---|---|---|---|
| 3,982,464 A * | 9/1976 | Sygnator | ............. | F16B 25/0089 408/230 |
| 5,074,729 A * | 12/1991 | Oba | .................... | F16B 25/0084 408/230 |
| 5,308,286 A * | 5/1994 | Uejima | ................. | F16B 25/103 148/587 |
| 6,887,023 B1 * | 5/2005 | Lu | ......................... | F16B 25/103 411/387.1 |
| 2009/0269163 A1 * | 10/2009 | Huang | .................. | F16B 25/103 411/387.8 |
| 2011/0116894 A1 * | 5/2011 | Huang | .................. | F16B 25/103 411/387.4 |
| 2014/0010618 A1 * | 1/2014 | Sheu | ................... | F16B 25/0015 411/387.2 |
| 2015/0292542 A1 * | 10/2015 | Tapata | .................... | F16B 35/04 411/337 |
| 2018/0080491 A1 * | 3/2018 | Scheerer | ............... | F16B 35/065 |
| 2018/0100533 A1 * | 4/2018 | Dill | ..................... | F16B 25/0084 |
| 2018/0100534 A1 * | 4/2018 | Dill | ..................... | F16B 25/0084 |

\* cited by examiner

*Primary Examiner* — Patrick J Maestri
(74) *Attorney, Agent, or Firm* — Alan D. Kamrath; Karin L. Williams; Mayer & Williams PC

(57) ABSTRACT

A drill bit structure of a self-tapping screw is rotated clockwise to screw with a workpiece or is rotated counterclockwise to remove from the workpiece, and the self-tapping screw contains: a head, a shank, and a drill bit. The head is configured to connect with a tool. The shank integrally extends from the head. A conical face has a tip, two arcuate grooves, and two first cutting edges. Each of the first cutting edges is formed on a connection portion of each arcuate groove and the conical face. The drill bit includes two third cutting edges, and each third cutting edge is adjacent to the tip, shapes of the two first cutting edges correspond to shapes of the two third cutting edges respectively, and heights of the two first cutting edges are not less than the conical face. Each first cutting edge has a reinforcement portion.

7 Claims, 6 Drawing Sheets

DRILL BIT STRUCTURE OF SELF-TAPPING SCREW

BACKGROUND OF THE INVENTION

Field of the Invention

The present invention relates to a screw, and more particularly to a drill bit structure of a self-tapping screw which is screwed into a workpiece quickly and easily.

Description of the Prior Art

A conventional screw is a hardware product which is applied to fix or connect an object in daily life, for example, a self-tapping screw is employed to screw with a workpiece when user cannot drill a threaded orifice in some places.

The conventional self-tapping screw contains a head, an outer threaded section, and a screw bit. The screw bit has a conical column formed on a distal end thereof, two symmetrical cut faces defined along central axis of the screw bit, two chip elimination faces formed adjacent to the two symmetrical cut faces respectively, two first cutting edges formed on two outer rims of the two symmetrical cut faces respectively, and two second cutting edges arranged below the two first cutting edges respectively. The screw bit has one or two protruded faces integrally extending on one of the two second cutting edges of one or the two cut faces respectively, at least one arcuate section extending reward from the one or two protruded faces so as to provide the one or two protruded faces on the two second cutting edges. Accordingly, a cutting sharpness of the two first and second cutting edges is enhanced. Furthermore, a guide orifice is defined between each of the two second cutting edges and each of the two protruded faces so as to eliminate chips quickly.

However, the two protruded faces of the conventional self-tapping screw are formed on the outer rims of the two symmetrical cut faces so when the self-tapping screw is screwed into the workpiece, the conical tip of the distal end of the screw bit abuts against the workpiece, and a tool drives the self-tapping screw to rotate so that the conical tip is worn or is drilled into the workpiece until the two protruded faces of the two second cutting edges contacts with and drill the workpiece to cause poor cutting effect. The self-tapping screw is screwed slowly and troublesomely. In addition, when the screw tip is drilled into the workpiece, the chips are elongated and twist around the screw tip and the threaded section to block between inside the workpiece, hence the self-tapping screw is stopped by the elongated chips, a drilling speed of the self-tapping screw is reduced, and a drilling time of the self-tapping screw is increased, thus damaging the self-tapping screw.

The present invention has arisen to mitigate and/or obviate the afore-described disadvantages.

SUMMARY OF THE INVENTION

The primary objective of the present invention is to provide a drill bit structure of a self-tapping screw which contains the two first cutting edges adjacent to the two third cutting edges respectively, and the two first cutting edges respectively correspond to the two third cutting edges and extend concavely, wherein the heights of the two first cutting edges are not less than a height of the conical face, the two third cutting edges are formed on and extend along the two first cutting edges respectively so as to enhance bottoms of the two third cutting edges and to increases lengths of the two first cutting edges on a circle diameter of a shank, thus enhancing the drilling capacity and speed of the two first cutting edges.

Further objective of the present invention is to provide a drill bit structure of a self-tapping screw by which when the self-tapping screw is screwed into the workpiece, the tip of the drill bit abuts against the workpiece so that the tool drives the self-tapping screw to rotate, and after the tip of the drill bit is worn lightly or is drilled into the workpiece, the two third cutting edges contact with and drill the workpiece so that the self-tapping screw is screwed into the workpiece quickly and easily.

Another objective of the present invention is to provide a drill bit structure of a self-tapping screw which when the self-tapping screw is screwed into the workpiece and the drill bit drills and cuts the workpiece, the chips are cut into the small pieces by the chipbreaker and are removed from the workpiece via the two arcuate grooves, the small pieces do not twist to stop drilling and cutting of the self-tapping screw, and the chipbreaker reinforces the two third cutting edges.

To achieve above-mentioned objectives, a drill bit structure of a self-tapping screw provided by the present invention is rotated clockwise to screw with a workpiece or is rotated counterclockwise to remove from the workpiece, and the self-tapping screw contains: a head, a shank, and a drill bit.

The head is configured to connect with a tool.

The shank integrally extends from the head.

The drill bit is integrally formed on an end of the shank away from the head, and a conical face is formed on a distal end of the drill bit. The conical face has a tip formed on a distal end thereof, two arcuate grooves defined on a peripheral side of the drill bit and extending to the tip of the conical face, and two first cutting edges, each of the two first cutting edges is formed on a connection portion of each of the two arcuate grooves and the conical face. The drill bit further includes two second cutting edges, and each of the two second cutting edges is defined on a connection portion of each of the arcuate groove and the peripheral side of the drill bit. The drill bit includes two third cutting edges oppositely formed, and each of the two third cutting edges is adjacent to the tip, shapes of the two first cutting edges correspond to shapes of the two third cutting edges respectively so that the two first cutting edges extend concavely. Heights of the two first cutting edges are not less than the conical face so that the two first cutting edges extend, and each third cutting edge has a reinforcement portion extending to a counterclockwise direction of the self-tapping screw.

DETAILED DESCRIPTION OF THE
PREFERRED EMBODIMENTS

The present invention will be clearer from the following description when viewed together with the accompanying drawings, which show, for purpose of illustrations only, a preferred embodiment in accordance with the present invention.

Figure 1:
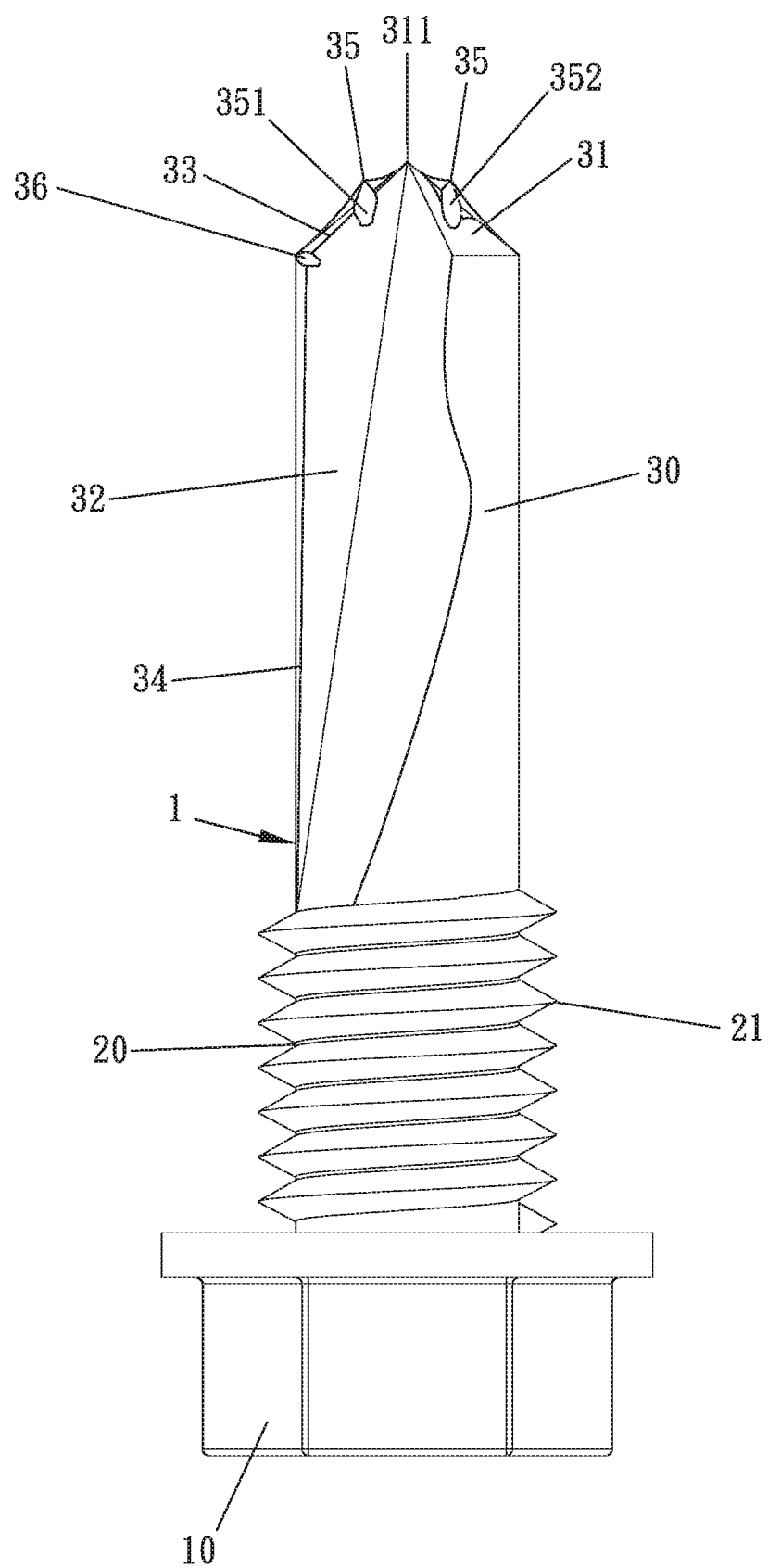
FIG. 1 is a side plan view showing the assembly of the drill bit structure of the self-tapping screw according to the preferred embodiment of the present invention.
Figure 2:
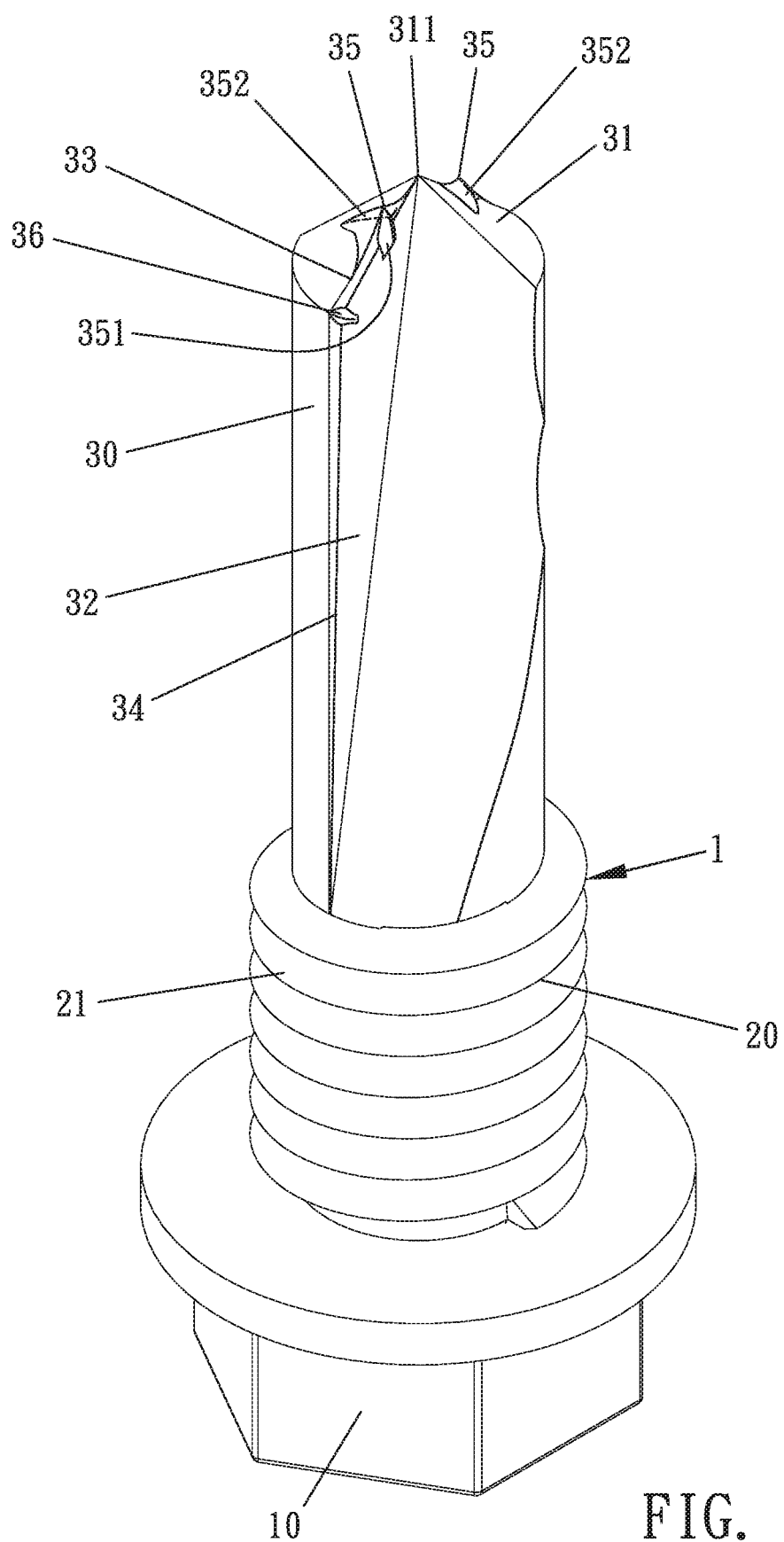
FIG. 2 is a perspective view showing the assembly of a drill bit structure of a self-tapping screw according to a preferred embodiment of the present invention.

With reference to FIGS. 1-2, a drill bit structure of a self-tapping screw 1 according to a preferred embodiment of the present invention is rotated clockwise to screw with a workpiece or is rotated counterclockwise to remove from the workpiece, and the self-tapping screw 1 comprises a head 10, a shank 20, and a drill bit 30, wherein the head 10 is configured to connect with a tool, the shank 20 integrally extends from the head 10, and the shank 20 includes threads 21 spirally surrounding therearound. The drill bit 30 is integrally formed on an end of the shank 20 away from the head 10 and is connected with the threads 21 of the shank 20, and the drill bit 30 includes a conical face 31 formed on a distal end thereof, wherein the conical face 31 has a tip 311 formed on a distal end thereof, two arcuate grooves 32 defined symmetrically on a peripheral side of the drill bit 30 and extending to the tip 311 of the conical face 31, wherein a width of each arcuate groove 32 increases from the shank 20 to the tip 311, and two first cutting edges 33, each of the two first cutting edges 33 is formed on a connection portion of each of the two arcuate grooves 32 and the conical face 31, and the drill bit 30 further includes two second cutting edges 34, wherein each of the two second cutting edges 34 is defined on a connection portion of each of the arcuate groove 32 and the peripheral side of the drill bit 30, the two second cutting edges 34 extend from the shank 20 to two protrusions 36. The drill bit 30 includes two third cutting edges 35 oppositely formed, and each of the two third cutting edges 35 is adjacent to the tip 311, wherein heights of the two third cutting edges 35 are equal, and shapes of the two first cutting edges 33 correspond to shapes of the two third cutting edges 35 respectively so that the two first cutting edges 33 extend concavely, wherein heights of the two first cutting edges 33 are not less than the conical face 31 so that the two first cutting edges 33 extend. Each of the two third cutting edges 35 has a chipbreaker 351, and each third cutting edge 35 has a reinforcement portion 352 extending to a counterclockwise direction of the self-tapping screw 1, wherein the chipbreaker 351 is configured to cut and stop clips and to reinforce each third cutting edge 35, and the reinforcement portion 352 is configured to reinforce each third cutting edge 35. In addition, the drill bit 30 includes two protrusions 36, wherein each of the two protrusions 36 is defined on a connection portion of each first cutting edge 33 and each second cutting edge 34.

Figure 3:
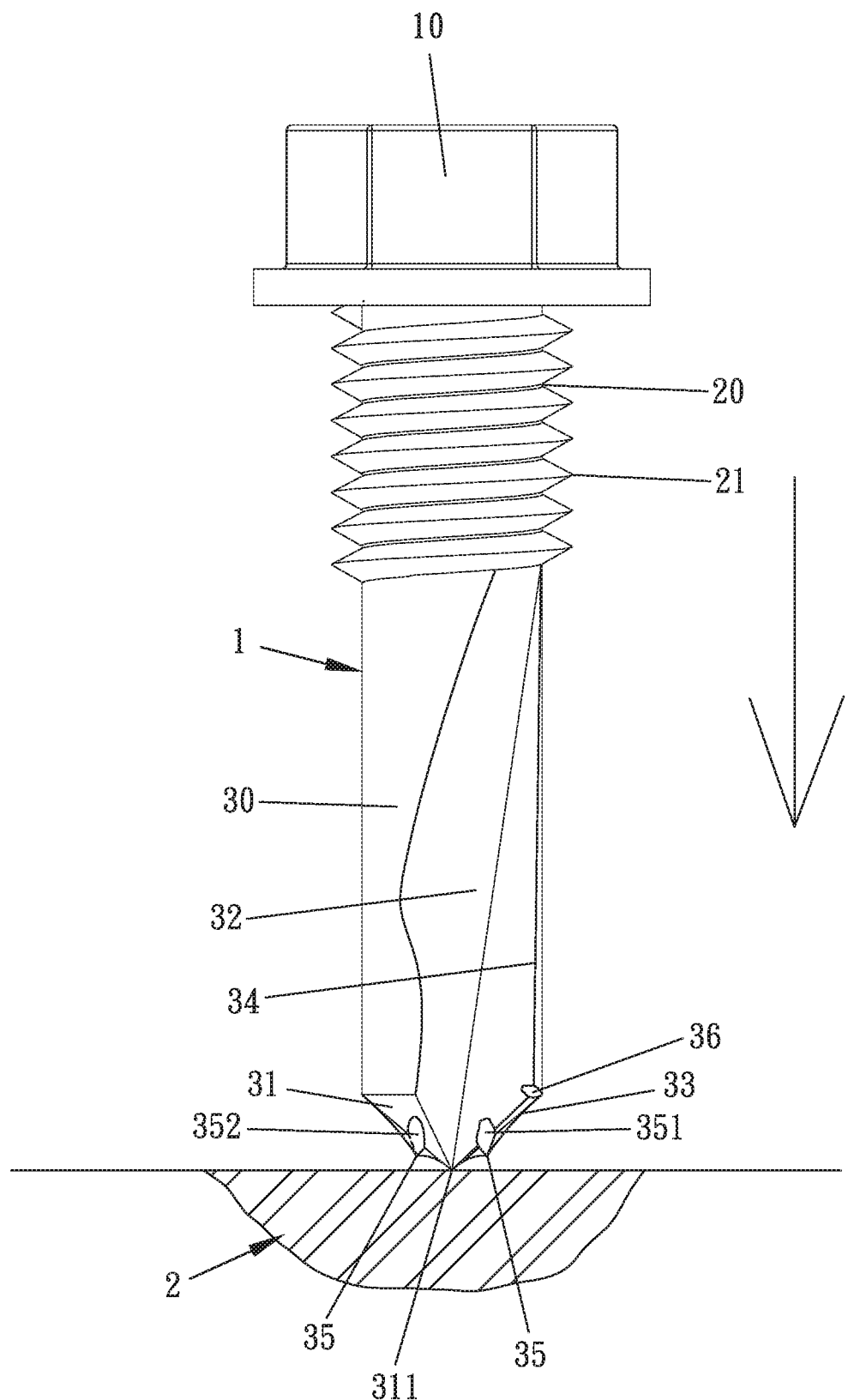
FIG. 3 is a side plan view showing the operation of the drill bit structure of the self-tapping screw according to the preferred embodiment of the present invention.
Figure 4:
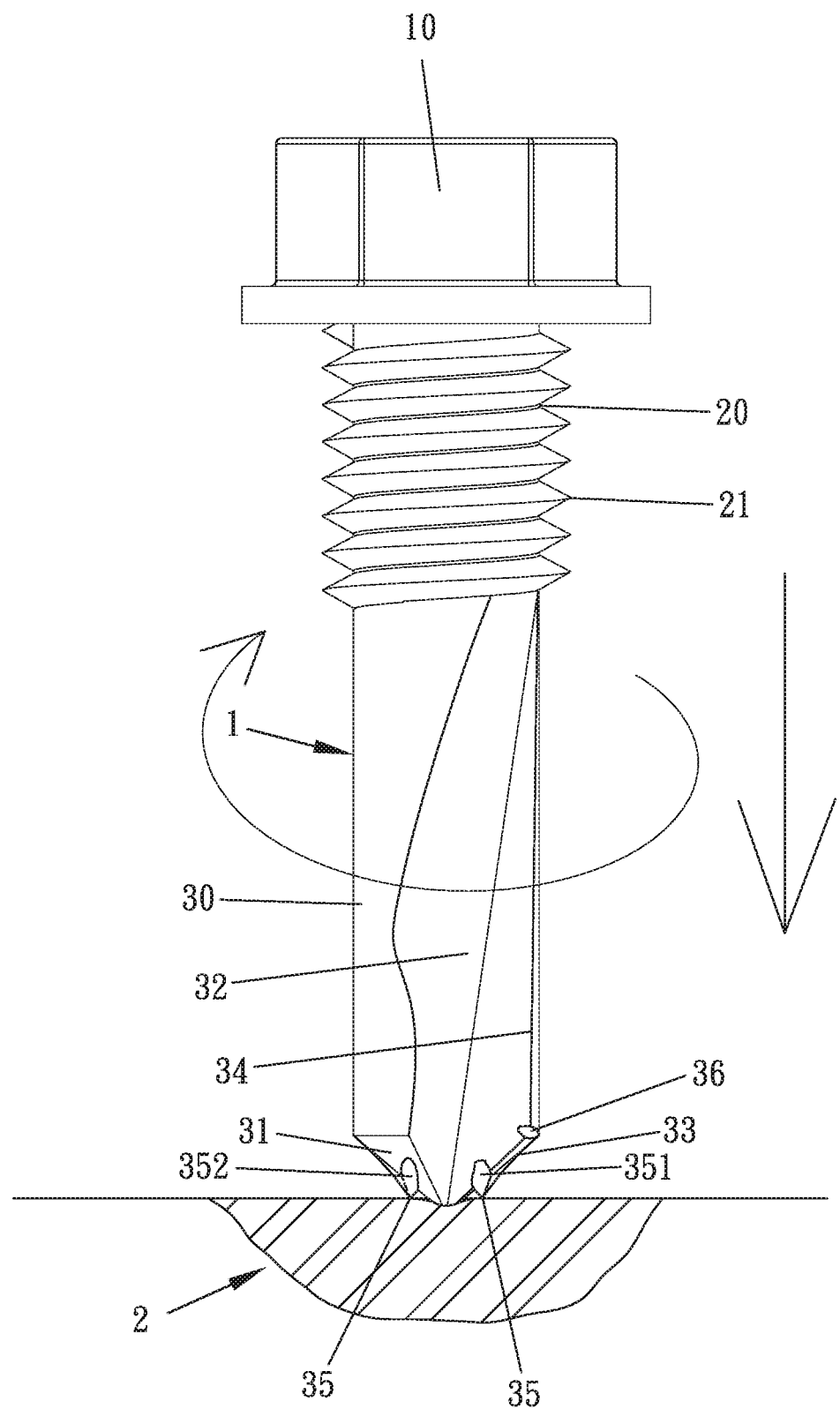
FIG. 4 is another side plan view showing the operation of the drill bit structure of the self-tapping screw according to the preferred embodiment of the present invention.

As shown in FIG. 3, when the self-tapping screw 1 is screwed into the workpiece 2, the tip 311 of the drill bit 30 of the self-tapping screw 1 abuts against the workpiece 2 so that the tool is fitted with or engaged by the head 10 of the self-tapping screw 1 to drive the self-tapping screw 1 to rotate clockwise. After the tip 311 of the drill bit 30 is worn lightly or is drilled into the workpiece, as illustrated in FIG. 4, the two third cutting edges 35 contact with and drill into the workpiece 2 to enhance drilling capacity, and the two first cutting edges 33 and the two second cutting edges 34 of the drill bit 30 drill and cut the workpiece, thus screwing the self-tapping screw 1 into the workpiece quickly and easily.

Figure 5:
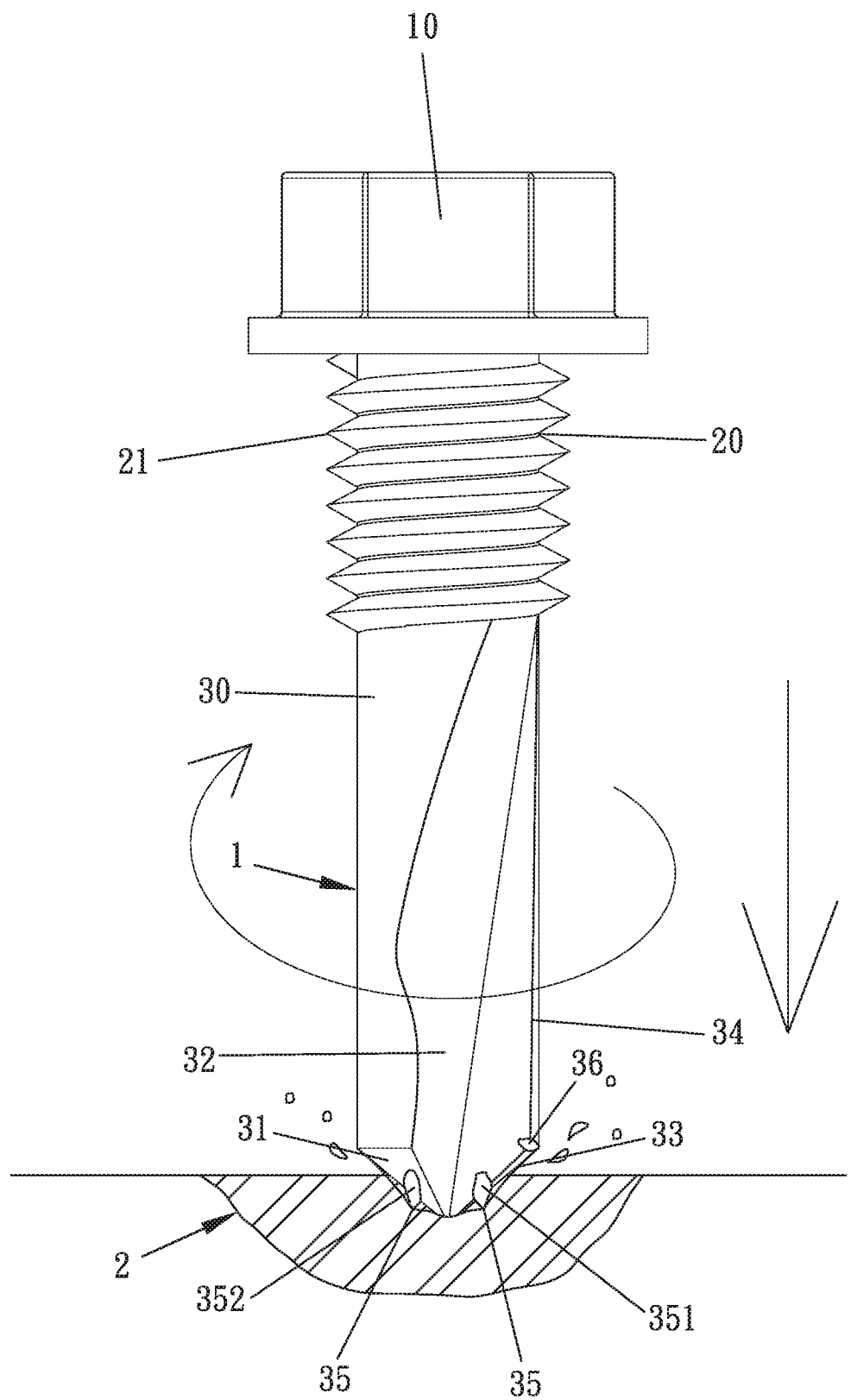
FIG. 5 is also another side plan view showing the operation of the drill bit structure of the self-tapping screw according to the preferred embodiment of the present invention.
Figure 6:
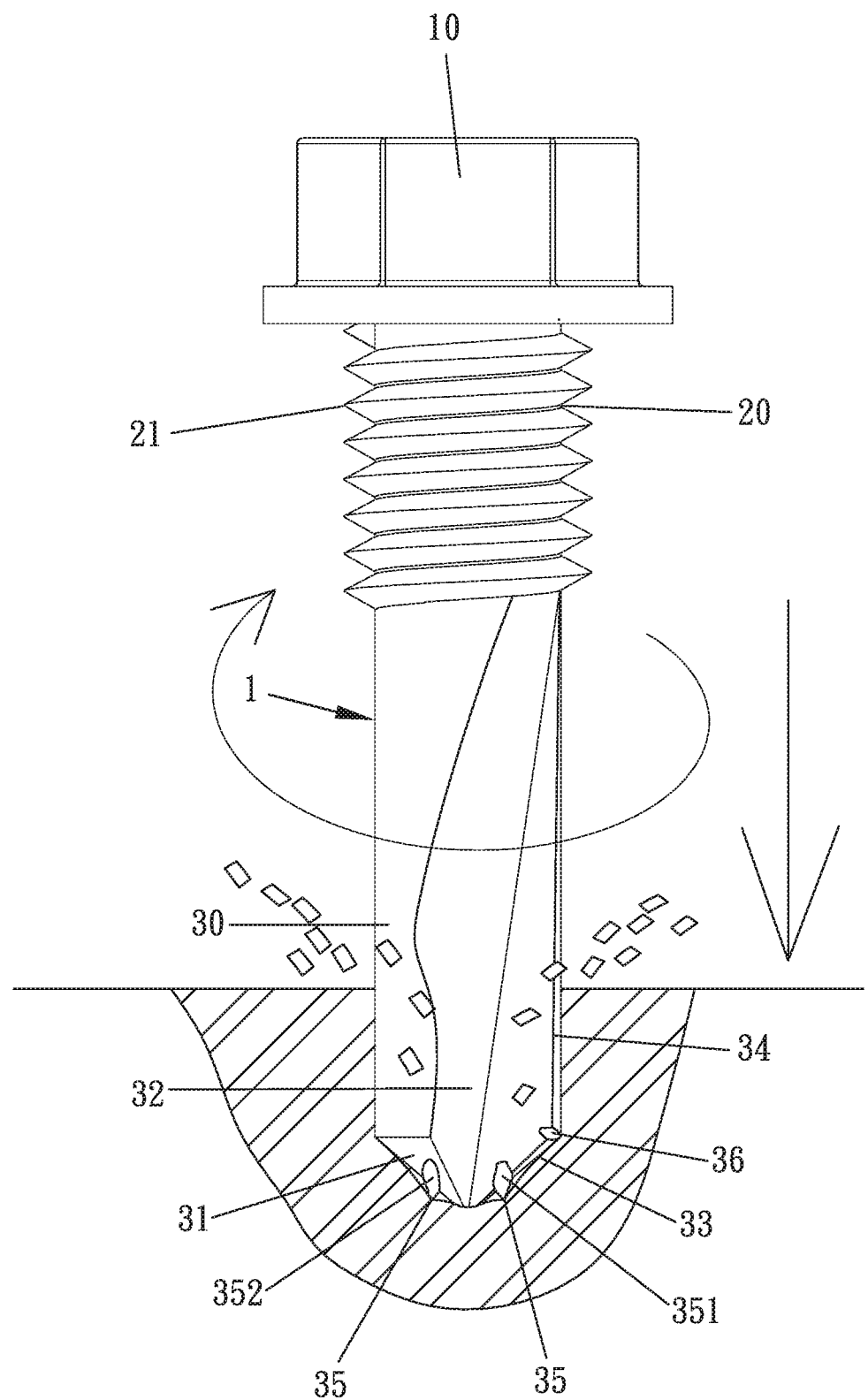
FIG. 6 is still another side plan view showing the operation of the drill bit structure of the self-tapping screw according to the preferred embodiment of the present invention.

Referring to FIGS. 5 and 6, when the two third cutting edges 35 contact with and drill the workpiece 2, chips are cut by the chipbreaker 351 so that the elongated chips are cut into small pieces, and the small pieces are removed from the workpiece 2 via the two arcuate grooves 32. Thus, the small pieces does not twist so as to be removed via the two arcuate grooves 32, and the self-tapping screw 1 drills and cuts the workpiece smoothly.

When the two first cutting edges 33 and the two second cutting edges 34 of the self-tapping screw 1 contact with the workpiece, the two protrusions 36 reinforce the connection portion of each first cutting edge 33 and each second cutting edge 34 to avoid a damage of the connection portion, thus enforcing the self-tapping screw 1.

The drill bit structure of the self-tapping screw of the present invention has advantages as follows:

1. The two first cutting edges 33 are adjacent to the two third cutting edges 35 respectively, and the two first cutting edges 33 respectively correspond to the two third cutting edges 35 and extend concavely, wherein the heights of the two first cutting edges 33 are not less than a height of the conical face 31, the two third cutting edges 35 are formed on and extend along the two first cutting edges 33 respectively so as to enhance bottoms of the two third cutting edges 35 and to increases lengths of the two first cutting edges 33 on a circle diameter of the shank 20, thus enhancing the drilling capacity and speed of the two first cutting edges 33.

2. When the self-tapping screw 1 is screwed into the workpiece 2, the tip 311 of the drill bit 30 abuts against the workpiece 2 so that the tool drives the self-tapping screw 1 to rotate. After the tip 311 of the drill bit 30 is worn lightly or is drilled into the workpiece 2, the two third cutting edges 35 contact with and drill the workpiece so that the two first cutting edges 33 and the two second cutting edges 34 drill and cut the workpiece 2 smoothly, and the self-tapping screw 1 is screwed into the workpiece 2 quickly and easily.

3. When the self-tapping screw 1 is screwed into the workpiece 2 and the drill bit 30 drills and cuts the workpiece 2, the chips are cut into the small pieces by the chipbreaker 351 and are removed from the workpiece via the two arcuate grooves 32, the small pieces do not twist to stop drilling and cutting of the self-tapping screw 1, and the chipbreaker 351 reinforces the two third cutting edges 35 and enhances the drilling capacity of the two third cutting edges 35.

While various embodiments in accordance with the present invention have been shown and described, it is clear to those skilled in the art that further embodiments may be made without departing from the scope of the present invention.

What is claimed is:

1. A self-tapping screw configured to be rotated clockwise to screw with a workpiece or to be rotated counterclockwise to remove from the workpiece, the self-tapping screw comprising:
   a head configured to connect with a tool;
   a shank integrally extending from the head; and
   a drill bit integrally formed on an end of the shank away from the head, and a conical face formed on a distal end of the drill bit, wherein the conical face has a tip formed on a distal end thereof, two arcuate grooves defined on a peripheral side of the drill bit and extending to the tip of the conical face, and two first cutting edges, wherein each of the two first cutting edges is formed on a connection portion of each of the two arcuate grooves and the conical face, and the drill bit further includes two second cutting edges, wherein each of the two second cutting edges is defined on a connection portion of each of the arcuate groove and the peripheral side of the drill bit, two third cutting edges oppositely formed, wherein each of the two third cutting edges is adjacent to the tip, wherein the two first cutting edges extend concavely and connects to the two third cutting edges, wherein heights of the two first cutting edges are not less than a height of the conical face so that the two first cutting edges extend, and each of the two third cutting edges has a reinforcement portion extending in a counterclockwise direction of the self-tapping screw.

2. The the self-tapping screw as claimed in claim 1, wherein the shank includes threads spirally surrounding therearound and connected with the drill bit.

3. The self-tapping screw as claimed in claim 1, wherein heights of the two third cutting edges are equal.

4. The self-tapping screw as claimed in claim 1, wherein the drill bit further includes two protrusions, wherein each of the two protrusions is defined on a connection portion of the each first cutting edge and the each second cutting edge.

5. The self-tapping screw as claimed in claim 1, wherein a width of each of the arcuate groove increases from the shank to the tip.

6. The self-tapping screw as claimed in claim 4, wherein the two second cutting edges extend from the shank to the two protrusions.

7. The self-tapping screw as claimed in claim 1, wherein each of the two third cutting edges has a chipbreaker extending in a clockwise direction and reinforcing the two third cutting edges.

* * * * *